United States Patent
Falken et al.

(10) Patent No.: US 11,001,727 B2
(45) Date of Patent: May 11, 2021

(54) RENEWABLE, BIODEGRADABLE MARKING WAX COMPOSITION

(71) Applicants: Danimer Bioplastics, Inc., Bainbridge, GA (US); Tecniq Holdings, LLC, Solana Beach, CA (US)

(72) Inventors: Rob Falken, Carlsbad, CA (US); Adam Johnson, Bainbridge, GA (US); Rachelle Arnold, Bainbridge, GA (US); Phillip Van Trump, Decatur, GA (US)

(73) Assignees: Danimer Bioplastics, Inc., Bainbridge, GA (US); Tecniq Holdings, LLC, Solana Beach, CA (US)

( * ) Notice: Subject to any disclaimer, the term of this patent is extended or adjusted under 35 U.S.C. 154(b) by 575 days.

(21) Appl. No.: 15/794,093

(22) Filed: Oct. 26, 2017

(65) Prior Publication Data

US 2018/0112095 A1    Apr. 26, 2018

Related U.S. Application Data

(60) Provisional application No. 62/413,150, filed on Oct. 26, 2016.

(51) Int. Cl.

| | |
|---|---|
| *C09D 11/00* | (2014.01) |
| *C09D 13/00* | (2006.01) |
| *C08K 5/09* | (2006.01) |
| *C08L 67/02* | (2006.01) |
| *C11C 3/00* | (2006.01) |
| *C09D 1/00* | (2006.01) |
| *C09D 4/00* | (2006.01) |
| *C09D 5/00* | (2006.01) |
| *C09K 3/00* | (2006.01) |

(52) U.S. Cl.
CPC ............... *C09D 13/00* (2013.01); *C08K 5/09* (2013.01); *C08L 67/02* (2013.01); *C11C 3/00* (2013.01)

(58) Field of Classification Search
USPC ............................... 106/31.01, 31.07, 31.08
See application file for complete search history.

(56) References Cited

U.S. PATENT DOCUMENTS

| | | | |
|---|---|---|---|
| 3,409,574 A | 11/1968 | Gros | |
| 3,933,708 A | 1/1976 | Brinkman | |
| 4,212,676 A | 7/1980 | Ueda | |
| 4,487,919 A * | 12/1984 | Trotter | C08G 63/16 528/272 |
| 4,822,417 A | 4/1989 | Kobayashi et al. | |
| 4,990,013 A | 2/1991 | Hejmanowski | |
| 5,383,954 A | 1/1995 | Craig | |
| 6,039,797 A | 3/2000 | Fistner, Sr. | |
| 6,136,078 A * | 10/2000 | Craig | C09D 13/00 106/31.08 |
| 2005/0037041 A1* | 2/2005 | Schlossman | A61Q 1/02 424/401 |
| 2009/0324846 A1* | 12/2009 | Tomaschke | C09D 11/17 427/553 |

FOREIGN PATENT DOCUMENTS

| | | |
|---|---|---|
| EP | 1146098 A1 | 10/2001 |
| WO | 2010006742 A1 | 1/2010 |
| WO | 2011009535 A1 | 1/2011 |

OTHER PUBLICATIONS

International Search Report and Written Opinion for PCT/US2017/058396, dated Feb. 9, 2018, 15 pages.

* cited by examiner

*Primary Examiner* — James E McDonough
(74) *Attorney, Agent, or Firm* — Luedeka Neely Group, P.C.

(57) ABSTRACT

The present disclosure is directed to marking compositions that are derived from environmentally friendly, biodegradable, and sustainable resources. Such compositions may be formulated in to writing and/or drawing instruments such as crayons. In various embodiments, the marking compositions include one or more of a structural component, a stiffening and/or laydown component, and a colorant. For instance, the structural component may be an ester wax composed of a diol and diacid, such as where the diols and diacids contain about 2 to about 14 carbon atoms each, such as where the structural component is present in an amount of from about 10% by weight to about 90% by weight, such as about 20% to about 80%, including about 60% of the composition. Additionally, the stiffening and/or lay down component may be a bifunctional fatty acid, such as stearic acid, which may be included in the composition, such as a stiffening agent as well as to enhance smoothness of laydown. A typically useful amount that may be used ranges from about 20% or less to about 80% or more, such as about 40% to 60% or more by weight of the composition. Further, in various embodiments, a naturally occurring, organic colorant may be provided as part of the marking composition.

23 Claims, No Drawings

RENEWABLE, BIODEGRADABLE MARKING WAX COMPOSITION

FIELD

This disclosure relates to wax marking compositions. More particularly, this disclosure relates to wax marking compositions which are renewable and biodegradable and to writing instruments made from such compositions.

BACKGROUND

Marking compositions are typically formulated from combinations of all of waxes, fatty acids, colorants, color extenders, and other additives. These marking compositions can be used to fabricate crayons, wax or grease pencils, and colored pencils, which can be used to draw, write, or color on porous and non-porous substrates. Crayons are most often used by children on various types of substrates including paper, such as notebook paper, coloring books, art paper, and poster board. Furthermore, crayons, wax or grease pencils, and colored pencils are available in a wide variety of colors, from primary colors to fluorescent colors.

Waxes are used as a material in the compositions of these crayons. A marking device, such as a crayon, is made of different waxes and additives to form both structural form of the crayon as well as the marking medium and the. For instance, the composition must necessarily be solid, such as to possess structural rigidity and strength, yet be soft enough to form a carrier for the pigment that is to be applied under pressure on a surface of the substrate to be marked. In the present time, such compositions used for the crayon waxes have been a comprise between obtaining satisfactory strength and resistance to breaking, while simultaneously possessing sufficient softeners and flow qualities under pressure to give a satisfactory laydown and marking.

A variety of marking compositions have been disclosed to the public, including, for example, U.S. Pat. Nos. 3,409,574, 3,933,708, 4,212,676, 4,990,013, and 5,383,954.

Despite this wide availability, consumers desire crayons with improved properties to obtain better laydown and better drawing qualities as well as less flaking from finished drawings using such crayons. Additionally, recently, there has been a push to move toward more environmentally friendly materials that come from renewable sources and are capable of biodegrading. However, due to their low melting points current products used as renewable waxes are not adequate for use in crayons because such crayons tend to melt and distort or break during both shipment and use.

Laydown, an important characteristic of crayons, is a measure of the smoothness qualities with which the writing composition transfers to the substrate, e.g., the writing surface. Children and parents prefer crayons with improved laydown because they allow the children to be able to produce marks and crayon drawings while exerting minimal pressure on the crayon. Smooth and slick color laydown is especially important to children who are very particular about the quality of their drawings and work. An added benefit that is particularly desired by parents and children is that a crayon having improved laydown characteristics yields marks having richer and more brilliant colors. However, on the other side, flaking, or loose particles of crayon material caused by the need to apply increased pressure to the crayon to produce laydown presents a clean-up problem in the home when children use crayons which flake because the flakes can be ground into the working surface or, as is often the case, home flooring.

It has been proposed that laydown of crayons may be improved by increasing the amounts of emollients, for example, oils such as castor or canola oil, in the crayon formulation. Although this approach has had some success in improving laydown, the emollient adversely affects other desirable properties of the marking composition, such as stability, color brightness, and tackiness. For instance, the strength of the writing instrument made from such emollient containing compositions is decreased, which in turn results in manufacturing problems as well as problems in the use of such writing instruments. For example, crayons and other writing instruments formed from such compositions break or crumble rather easily, especially when used by children.

Additionally, the use of greater amounts of emollients also adversely affects the tackiness of the crayon and/or other writing instrument. For instance, the writing instrument becomes excessively tacky to the touch, especially when held between the fingers during drawing or writing. Such excessive tackiness creates an unpleasant feeling for the user. There is also excessive transfer of some of the components of the writing composition, for example, the pigment, to the user's hands or clothes. Hence, the excessive transfer of such materials, besides creating an unpleasant feeling to the user, can cause unnecessary stains to the hands and clothes as well as in areas such as carpets surrounding the area where the crayons are used.

Presently, crayons use paraffin wax as the major component. Paraffin wax is composed of a mixture of hydrocarbon molecules and is derived from petroleum, coal, or oil shale. Slack wax, for instance, is a mixture of oil and wax, and is typically used as the feedstock for paraffin wax. However, slack wax and many of its related materials are considered to be not readily biodegradable, and because of the petroleum source, is not considered to be renewable. In order to achieve these two characteristics, polyesters may be utilized as the majority wax component for crayons, such as in certain embodiments disclosed herein.

Thus, there remains a need for a renewable, degradable marking composition that has the desirable laydown characteristics. More particularly, there is a need for a renewable, degradable marking composition that minimizes friction between the crayon and the substrate to allow for a smooth and slick laydown of color with minimal exertion of pressure by the user. There also remains a need for a renewable, degradable marking composition with improved laydown properties that is not overly tacky to the touch and does not exhibit excessive flaking. There additionally remains a need for a renewable, degradable marking composition having improved laydown properties that does not excessively transfer materials to the hands or clothes of the user. There further remains a need for a renewable, degradable marking composition having improved laydown characteristics that has the desirable mechanical strength to withstand use by children.

These and other objects and advantages of the present marking compositions, as well as additional inventive features, will become apparent from the description of the present invention provided herein.

SUMMARY OF THE INVENTION

The above and other needs are met by a marking composition according to the current disclosure. The inventive marking composition exhibits improved structural integrity, color coverage, color intensity and uniformity, as well as smooth and slick laydown with minimal exertion of pressure along with less flaking when applied to a substrate or on other writing surfaces. The marking composition as herein provided is also substantially free of tackiness to the touch.

According to one embodiment, the marking composition includes a condensation polymer which is a reaction product of a diol and a dicarboxylic acid. The condensation polymer is present in an amount from about 10% to about 90% by weight of the marking composition. The marking composition also includes one or more fatty acids containing from 10 to 24 carbon atoms, or an ester thereof. The fatty acid(s) or ester(s) are present in an amount from about 20% to about 80% by weight of the composition. The marking composition also includes a colorant, which is present in an amount from about 1% to about 15% by weight of the composition.

In another aspect, the present disclosure provides a writing instrument which incorporates a marking composition. The writing instrument may be selected from the group consisting of crayons, wax pastels, grease pencils, water-soluble crayons, colored ink markers, colored charcoals, and chalks. More preferably, the writing instrument is a crayon. The marking composition used in the writing instrument includes a condensation polymer which is a reaction product of a diol and a dicarboxylic acid. The condensation polymer is present in an amount from about 10% to about 90% by weight of the marking composition. The marking composition also includes one or more fatty acids containing from 10 to 24 carbon atoms, or an ester thereof. The fatty acid(s) or ester(s) are present in an amount from about 20% to about 80% by weight of the composition. The marking composition also includes a colorant, which is present in an amount from about 1% to about 15% by weight of the composition.

In certain embodiments according to the present disclosure, the polymer preferably makes up about 20% to about 80% by weight of the composition.

In some embodiments according to the present disclosure, the diol and the dicarboxylic acid used in making the condensation polymer each preferably contain 2 to 14 carbon atoms. More preferred condensation polymers may be selected from the group consisting of poly(butylene adipate), poly(hexylene succinate), and poly(propylene adipate).

In some instances, the condensation polymer preferably has a weight average molecular weight of from about 5000 to about 15,000 daltons and a melting point from about 40 C to about 75 C. The condensation polymer may also preferably have a Shore D hardness value from 35 to 65.

In certain embodiments according to the present disclosure, the composition is made up of one or more fatty acids containing from 14 to 18 carbon atoms, or an ester thereof, in an amount from about 20% to about 80% by weight of the composition. In certain preferred embodiments, the one or more fatty acids comprise are fully saturated fatty acids, such as stearic acid and/or palmitic acid. The weight average molecular weight of the one or more fatty acids preferably ranges from about 100 to about 400 daltons.

In certain embodiments according to the present disclosure, the colorant is preferably an inorganic pigment. The pigment is preferably made up of particles having an average particle size from about 0.1 micron to about 25 microns. In other embodiments, however, the colorant is preferably derived from plants or vegetables.

In certain embodiments according to the present disclosure, the composition may also include one or more additives selected from the group consisting of rust preventives, anticorrosive agents, fillers, leveling agents, viscosity modifiers, drying agent, plasticizers, foam inhibitors, mold release agents, and polymer stabilizers.

DETAILED DESCRIPTION

According to the present disclosure, a wax marking composition is provided. The marking composition of the present disclosure may include one or more, e.g., combinations, of a wax, a fatty acid, and/or a colorant, wherein the wax and/or fatty acid component is derived at least partially from an organic or inorganic acid, such as a carboxylic acid and/or an alcohol, such as an acid having at least one of the hydroxyl groups replaced by an alkoxy group. In particular, in various instances, the main structural component may be a fatty acid component such as an ester wax, which may be supplied in such chemically and mechanically sufficient amounts that the marking composition has the desired smooth laydown characteristics when applied on substrates, as well as the strength to withstand the use by children.

Accordingly, in one aspect, the present disclosure provides a marking composition that has been formed into particular writing instruments. For instance, as herein disclosed writing instruments such as crayons, wax pastels, grease pencils, water-soluble crayons, colored ink markers, colored charcoals, chalks, as well as other similar writing instruments, are provided, which writing instruments may be prepared from the marking compositions, e.g., fatty acid compositions, disclosed herein. In another aspect, a method of making such marking compositions, and/or its use in fabricating a writing instruments therefrom, such as a crayon, or other suitably configured writing instrument having the herein disclosed writing and/or use characteristics, is provided. Additionally, packaging including a plurality of the writing instruments, such as in a variety of colors is also provided.

In some aspects of the present disclosure, a marking composition is described. The marking composition includes a structural component in an amount of from about 10% by weight to about 80% by weight of the composition. In some implementations, the structural component is an ester wax comprised of a diol and diacid, and the diols and diacids can contain 2 to 14 carbon atoms each.

In various other implementations, the ester wax can be one or more of poly(butylene adipate), poly(hexylene succinate), and/or poly(propylene adipate). The ester wax preferably has a melting point between 40 and 75° C., a Shore D hardness between 35 and 65, preferably between 45 and 55, and preferably an acid number of 10-40. The ester wax is 25-100% renewable, and preferably contains 0-15% molar excess diacid or diol. The ester wax preferably has a molecular weight between 5000 and 15000 daltons. In other aspects of the present disclosure, a marking composition includes a colorant in an amount of from about 1% by weight to about 15% by weight of the composition.

In yet other aspects, the marking composition can include a fatty acid in the amount from about 3% by weight to about 60% by weight of the composition, and/or a stiffening agent in the amount from about 3% by weight to about 60% by weight of the composition. In some implementations, the stiffening agent is a stearic acid. In yet other aspects, a marking composition can further include a colorant. The colorant can be an organic pigment.

In preferred implementations, the marking composition can be formed into a writing instrument such as a crayon, a mechanical crayon, a removable marking stylus, or the like.

In particular embodiments of the present disclosure, a marking composition may include one or more wax components, a fatty acid component, and a colorant. In various instances, the marking composition includes one or more, e.g., combinations of waxes and/or fatty acids, and may include a combination of one or more colorants. Accordingly, in certain instances, the marking composition of the present disclosure may include at least one wax and/or fatty acid component, such as a wax and/or fatty acid component that is formulated so as to impart desired characteristics to the marking composition, such as hardness and/or mechanical strength to the composition. Particularly, in particular embodiments, the main structural component of the marking composition may be a fatty acid component, as herein disclosed. Additionally, in various embodiments, a stiffening agent, such as bifunctional fatty acid, such as stearic acid may be included in the composition, such as a stiffening agent as well as to enhance smoothness of laydown.

Such hardness imparts structural form to the marking composition, but should be soft enough to allow the composition to be employed as a marker, such as a crayon.

Specifically, the main structural component should be a solid that is formulated to possess the structural rigidity and strength to form a satisfactory supporting structure that may be used without breaking, but should also be soft enough to form a carrier for the colorant, e.g., pigment, that is to be deposited or otherwise delivered under pressure on to the surface of the material to be marked with the desired laydown and/or flow qualities. Hence, as formulated herein, such hardness may be imparted to the composition from the fatty-acid component.

Additionally, the bifunctional fatty acid, e.g., stearic acid component, may be included so as to impart structural form and/or stiffness to the marking composition, as well as to enhance softness enough to allow the composition to be employed as a marker, such as a crayon, having improved laydown characteristics. Further, as provided herein, in various embodiments, the marking compositions of the present disclosure may be formulated in such a manner so as to be environmentally friendly and/or derived from renewable sources and may be capable of biodegrading, such as where the fatty acid structural component and the bifunctional fatty acid, e.g., stearic acid, stiffening component(s) are derived from environmentally friendly, sustainable, natural resources.

However, in certain instances, a wax component may be provided. Any suitable wax or a plurality of wax components may be used so long as it can be formulated into a supporting structure having sufficient hardness, such as where one or more of the wax components may have a hardness of about 10, of about 15, of about 20, of about 25, of about 30 of about 40, of about 50 or 60, or more at 25° C., as determined by Shore hardness method set forth in ASTM D2240. Further, one or more wax components may be used such as where the wax component to be used may be such that it has a melting point of about 110° to about 120° to about 140° to about 160° or 165° to about 180° or up to about 200° to 210° F. In certain instances, one or more of the wax components may have a molecular weight in the range of 3,000 to 150,000 to about 500,000 to about 1 million or 2 million, or even up to 4,000,000 or 5,000,000 or more, such as up to 6,000,000 or more. For example, the wax component, as herein described, may be formulated in such a manner that when configured as a writing instrument, such as a crayon, the marking composition, e.g., the writing instrument, is substantially rigid to the touch, has the wanted strength characteristics when pressure is applied to the instrument when marking on a substrate, as well as the desired smooth laydown characteristics.

A suitable wax component may be derived from a vegetable, insect, or animal source. Such wax components may include one or more, e.g., a combination, of polyethylene, an amorphous polypropylene, paraffin, and the like. Where a paraffinic wax component is to be used, it may include paraffin hydrocarbons of the $C_nH_{2n+2}$ series. In such an instance, the paraffin may be derived from oil, such as from animal, e.g., beef tallow, or vegetable oils. In various instances, the wax component may include a hard wax, such as one or more of beeswax, candelilla wax, carnauba wax, ceresine wax, fatty acid esters, alkali and alkaline earth metal and ammonium salts of fatty acids, microcrystalline wax, ozokerite wax, rice wax, and/or combinations thereof. In certain instances, polyethylene may be provided as a component in the marker composition such as to improve the marker composition, e.g., by increasing resistance to high temperatures. For instance, polyethylene is a polymer that is created though the chemical synthesizing of ethylene, such as from petroleum or natural gas, and can be added to the composition melt prior to insertion into the mold. Other examples of suitable waxes include those made from the condensation polymerization of diols and diacids, including, but not limited to ethanediol, propanediol, butanediol, cyclohexanediol, and the like. Specifically, exemplary diols may include various 1,2-diols and/or 1,3 diols and/or 1,4-diols, such as having a formula akin to one or more of: $RC(O)CH_2CH_2OH$ or $RCH(OH)CH_2CH_2OH$ or $(CH2)_n(CH_2OH)_2$, and the like, where n=the number of carbon backbone. For example, in particular embodiments, the wax component may be one or more of 1,2-ethanediol; 1, 2-propanediol; 1,3-propanediol; 1,4-butanediol; 1,2-cyclohexanediol; and the like. Combinations of said waxes are also included in the present disclosure.

Likewise, in certain instances, a composition of the disclosure may include a soft wax and/or emollient. Examples of soft waxes suitable for use in accordance with the disclosure include lanolin wax, hydrogenated lanolin wax, hydrogenated castor oil, a hydroxypolyester, and the like. Particularly, soft waxes may be employed so as to enhance the laydown characteristics of the marker composition. Additionally, an emollient may be included so as to enable the marking composition to be more readily and easily transferred to a substrate through the application of typical pressure to the marking composition as it is applied to the substrate. Examples of emollients may include one or more of lanolin oil and its derivatives, mineral oil, petrolatum, vegetable shortenings, plant oils, silicones, and mixtures thereof. The emollient may be employed so as to provide a lubricant effect or smoothness to the marking composition such as to facilitate the gliding of the marking composition across the surface of a substrate, and to ensure a smooth laydown of the marking composition. In various instances, the soft waxes, e.g., a hydroxypolyester, may be employed so as to hold one or more emollients within the composition, and may function to make the marking composition less oily to the touch.

In various instances, a microcrystalline wax may be provided. Microcrystalline wax is created when petroleum is de-oiled, such as part of the petroleum refining process. For instance, a microcrystalline wax and mixtures thereof may be derived from animals, insects, and vegetables. Such wax differentiates itself from paraffin wax because it has a higher percentage of isoparaffinic hydrocarbons and naphthenic hydrocarbons, and has a melting point around 140° to 210° Fahrenheit. A key characteristic of microcrystalline wax includes the fineness of its crystals, high tensile strength, and higher melting point. Accordingly, crystalline wax may be useful herein so as to aid in the binding of solvents and oils into the final marking composition.

Any suitable amount of the soft wax can be used to prepare the marking composition. In some embodiments, the soft wax can be present in an amount from about 10% or 20% or less up to about 40% or about 50% or about 60% or about 80% by weight of the marking composition. Additionally, any suitable amount of emollient may be used in the marking composition, but will typically be low if included at all. For instance, the emollient may be present in an amount of about 1% or 2% or 5% or less to about 25% or 35% or 45% or more by weight of the marking composition. However, where an emollient is present in a more significant amount, the soft wax and/or emollient can be present in much lower amounts such as an amount of up to about 4% by weight of the marking composition. In certain instances, e.g., where a large amount of a soft wax is included, the emollient can be present in a low amount or omitted while still maintaining the desired improved laydown characteristics. It is to be noted, increased amounts of an emollient can increase the tackiness adversely. When both a soft wax and emollient are used, the hard wax may be used in an amount that is equal to or in excess of the amount of soft wax present.

Further, any suitable amount of the wax component, e.g., one or more of a hard and/or soft wax component may be included in the marker composition. For instance, the overall wax component, when present, may be present in an amount of about 0.10% to about 80% or about 90% or 95% by weight, such as from about 1% or about 5% or about 10% to about 60% or about 70%, such as from about 20% or 30% to about 40% or 50% by weight of the marking composition. In various embodiments, the wax component may be present in an amount of about from about 39% or 40% by weight to about 64% or 65% by weight of the marking composition, such as in an amount of from about 45% by weight to about 55% by weight of the marking composition. It is to be noted that an excessive amount of the wax component can adversely affect the laydown property.

In certain instances, a fatty acid component may be provided. The fatty acid component may be included in addition to or in substitution for the wax component and/or the soft wax component. For instance, the fatty acid component may be included so as to itself form the main structural component of the marking composition, such as without the inclusion of a typical wax component, or it may be excluded altogether. Where included the fatty acid component may be derived from an organic acid source, and in other instances, it may be derived from an inorganic acid source. For instance, the fatty acid component may be or otherwise include a carboxylic acid and/or an alcohol or alcohol derivative, such as an acid wherein at least one of the hydroxyl groups has been replaced by an alkoxy group. In particular, in various instances, the fatty acid component may be an ester wax that is supplied in such chemically and mechanically sufficient amounts that when formed into a writing instrument evidences the desired compositional characteristics of improved structural integrity, color coverage, color intensity and uniformity, as well as smooth and slick laydown with minimal exertion of pressure along with less flaking when applied to or on substrates. For example, the fatty acid component, as herein described, may be formulated in such a manner that when configured as a writing instrument, such as a crayon, the marking composition, e.g., the writing instrument, has substantial structural integrity and is substantially free of tackiness to the touch, has the desired smooth laydown characteristics when applied on substrates, as well as the strength to withstand the use by children.

Particularly, the fatty acid component of the marking composition may include or be derived from an ester based composition, such as a wax ester. For instance, in various instances, the fatty acid (and/or wax component if included) may be an ester formed of a fatty acid precursor and a fatty alcohol, such as derived from the reaction of the hydroxyl group of the alcohol reacting with the carboxyl group of the acid, e.g., the organic acid, so as to form the ester bonds. In such instances, the wax ester may be saturated or unsaturated, depending on the desired melting point, e.g., strength vs. ease of laydown characteristics. For example, where greater strength is desired, the wax ester may be formulated so as to be relatively saturated, thereby having a higher melting point, e.g., at room temperature, and therefore have a stiffer composition and greater tensile strength.

However, where smoother laydown characteristics are desired, the wax ester may be formulated so as to be relatively more unsaturated, thereby having a lower melting point, e.g., at room temperature, so as to give the final marking composition an improved quality and smoothness of laydown, such as when applied to a substrate, such as paper. Hence, when formulating the marking composition, such composition may contain any suitable fatty acid, such as a saturated fatty acid, an unsaturated fatty acid, or a mixture of fatty acids, wherein the particular fatty acid precursor has been selected so as to result in a final fatty acid component that maximizes strength while minimizing tackiness and yet enhancing the smoothness of laydown of the final marking composition.

Likewise, the carbon length of the carbon backbone may be of any suitable length so as to modulate the steric orientation and/or phase transition characteristics of the wax ester, and thereby modulate the strength vs. laydown characteristics of a marking composition formulated by use of the wax ester. For instance, in various embodiments, the wax ester may be derived from a combination and/or admixture of a fatty acid precursor and a fatty alcohol whereby these two elements to be admixed have different carbon backbone chain lengths, or they may be isolated from a naturally occurring substance, or both. Particular, in certain instances, the carbon chain length in the fatty acid precursor may be from less than 4 to 40 carbons long or longer, such as from about 6 to about 32 carbons long, such as from about 8 or 10 carbons to about 28 to 26 carbons long, including about 12 or 14 to about 22 or about 24 carbons long, including numbers there between. Similarly, the carbon chain length in the fatty alcohol may be from less than 16 to 60 or 80 or even 100 carbons long or longer, such as from about 18 to about 50 or about 60 carbons long, such as from about 20 or 22 carbons to about 36 to 40 carbons long, including about 24 or 26 to about 30 or about 34 carbons long, including numbers there between.

Hence, when combining the fatty acid precursor with the fatty alcohol precursor to derive the fatty acid component, the resultant wax ester may have a carbon backbone chain length from about 2 or 3 or 4 to about 120 or about 150 carbons in length or longer. Particularly, the fatty acid and/or fatty alcohol reactant precursors can be selected in such a manner as to provide the fatty acid component and/or the overall marking composition the desired strength vs. laydown characteristics. More particularly, the overall fatty acid component, e.g., of a selected carbon backbone length, is one that adds strength to the composition, especially when the composition is fabricated as a writing instrument, such as a crayon. In such instances, the longer the carbon chain fatty acid employed, the greater hardness and mechanical strength will be supplied to the final composition.

However, this is balanced out by the fact that the greater the strength of the fatty acid component, the stiffer the marker structure will be and the more force must be exerted to cause the writing instrument to lay down the marking composition, and thus, the more difficult it will be to write, and the less smooth the marking will be. On the other hand, the fewer the carbon chain backbone, the softer the marker structure will be and the easier the laydown will be, but the writing instrument will be more prone to breakage and/or the tackier it may be. Hence, the fatty acid and/or fatty alcohol precursors should be selected so as to give the resultant fatty acid component the desired carbon backbone length so as to give the overall marking composition the desired strength and laydown characteristics.

Accordingly, in particular instances as herein disclosed, the fatty acid component may typically have a carbon chain backbone that ranges from about 6 to 40 carbon atoms, such as from about 16 to about 24 carbon atoms in length. Additionally, various different side or branch chain elements may be included so as to modulate these various characteristics. Particularly, suitable examples of the fatty acid include lauric acid, myristic acid, palmitic acid, stearic acid, and the like as well as mixtures thereof. Stearic acid, and/or its derivatives and/or isomers, for instance, may be an exemplary fatty acid. For instance, stearic acid is a common hydrophobic fatty acid that may be derived from animal fats, such as beef tallow, or vegetable oils, and is thus hydrophobic and can serve as a binder. A typically useful amount that may be used ranges from about 20% or less to about 40% or more by weight. More particularly, in various instances, stearic acid, succinic acid, and/or adipic acid, and combinations thereof may be provided, such as to from a base component having emollient like slickening properties and/or smooth laydown characteristics. In such instances, these components may be derived from vegetable sources, so as to be 100% natural and/or vegan. Any other appropriate wax and/or fatty acid component may be used. Hence, combinations of said waxes are also included in the present disclosure.

In particular embodiments, an additional fatty acid component may be added, such as for the purpose of serving as a stiffening agent that may further enhance laydown. For instance, a saturated fatty acid having a polar head group, e.g., that can be attached to metal cations, such as metal oxide pigments, and a nonpolar chain, e.g., that confers solubility in organic solvents, may be included. For instance, the stiffening agent may be a fatty acid having an 18-carbon chain backbone, and may have a formula such as $C_{17}H_{35}CO_2H$. Particularly, the stiffening saturated fatty acid may be stearic acid or a palmitic acid, or a salt or ester thereof, or other such fatty acids that easily undergo esterification in the presence of alcohols. In certain embodiments, stearin may be included. In particular embodiments, the stearic and/or palmitic acid may be obtained such as from animal and/or vegetable fats and oils, such as produced by saponification and distillation. Hence, when included in a marking composition, such bifunctional fatty acids as steric and/or palmitic acid may function to balance the structural hardness provided by the wax and/or other fatty acid components, while at the same time departing increased stiffness to the marking composition.

In various instances, the fatty acid component, which may also include a bifunctional fatty acid, e.g., steric acid, component may be synthesized such as by reacting a suitable fatty acid precursor with a suitable fatty alcohol precursor so as to give a resultant fatty acid component having a selected carbon backbone chain length, such as by means well known in the chemical arts, such as by esterification in the presence of a suitable catalyst so as to derive the resultant ester based fatty acid and water. In certain instances, the fatty acid precursor may be an organic compound having a carbon backbone with one or more functional groups attached thereto, such as one or more carboxyl groups. For instance, a suitable fatty acid precursor may be a carboxylic acid, such as an organic compound including a single "mono" carboxyl group, e.g., C(O)OH, and having the general formula of R—C(O)OH, where R refers to a straight or branched chain carbon backbone of a length described herein, such as from 2 to about 40 carbons in length, such as where R may be an even number.

In particular instances, the fatty acid precursor may be a dicarboxylic or tricarboxylic acid, such as containing two or three carboxyl groups therein, e.g., respectively.

For instance, the fatty acid precursor may be a dicarboxylic having the general formula $HO_2C$—R—$CO_2H$, where in various instances, R can be aliphatic or aromatic. Particularly, a suitable dicaroxylic acid may be one or more of an oxalic acid, malonic acid, succinic acid, glutaric acid, adipic acid, pimelic acid, suberic acid, azelaic acid, sebacic acid, brassilic acid, dodecanedioic acid, hexadecanedioc acid, and the like, such as where the carbon backbone includes from about 2 to about 20, such as about 4 to about 14, including about 6 to about 8 or 10 carbons in length, such as with a formula HOOC—$(CH_2)_n$—COOH, where n is the number of carbon atoms in the straight chain, and the carboxyl groups are on the ends of the chain, although various branched chain backbone configurations may also be used. More particularly, an exemplary fatty acid precursor may be adipic acid.

Additionally, in certain instances, the fatty alcohol precursors may include a carbon backbone based chemical compound having one or more functional groups, such as one or more hydroxyl (OH) groups attached to or branching off from the carbon backbone, such as an alcohol, e.g., having a single hydroxyl group attached, or a diol, e.g., having two hydroxyl groups attached to the carbon backbone, a triol, e.g., having three hydroxyl groups attached, or more, e.g., a polyol, and the like. For instance, in certain instances, the fatty alcohol may be a saturated straight chain alcohol, such as having the general formula of $C_nH_{2n+1}OH$, where n=the number of carbons in the carbon chain backbone, as described above. In other instances, the fatty alcohol may have a branched chain backbone and/or the chemical compound may be unsaturated.

In particular embodiments, the fatty alcohol component may be a diol, such as a chemical compound having a carbon backbone chain and further containing two hydroxyl functional groups. In such instances, the OH functional groups can be relatively closer together or spread out. For instance, exemplary diols may include compounds having OH functional groups that are closer together, such as ethylene glycol, or diols having relatively separated OH functional groups, such as 1,4-butane diol, e.g., HO—$(CH_2)_4$—OH, bisphenol A, propylene-1,3-diol, beta propylene glycol, e.g., HO—$CH_2$—$CH_2$—$CH_2$—OH, and the like, such as having the general formula HO—$(CH_2)_n$—OH, where n=the number of carbons in the carbon chain backbone, as described above. In various instances, the fatty alcohol component may be a triol, such as a glycerol, or a trihydroxybenzene, such as a benzenetriol, and the like. Additionally, in various instances, the fatty alcohol component may be a polyol, such as an alcohol containing multiple hydroxyl groups, such as polyesters or polyurethane derivatives. Such fatty alcohol precursors, as herein disclosed, can be directly acquired or synthesized such as via one or more of various substitution or reduction reactions, such as reacting an alkyl halide with a base, or reacting an aldehyde or ketone with a hydride. They may also be synthesized through hydrolysis, such as by reacting a suitable alkene with an acid so as to catalyze a hydration reaction.

In various instances, the fatty acid precursor may be reacted with the fatty alcohol precursor so as to produce the fatty acid component having the desired carbon backbone length, either straight or branch chained, such as with the desired characteristics. Such a reaction can be performed in any suitable manner such as by a deprotonation reaction, a substitution reaction, a reduction, hydrolysis, dehydration reaction, and/or esterification.

For instance, in certain instances, the fatty acid component may be produced by an esterification reaction, such as a reaction having the following general format: $R\text{---}OH + R'\text{---}COOH \rightarrow R'\text{---}COOR + H_2O$, such as where the water may be constantly removed to drive up the yield of production. Further, although the fatty acid component may be derived through synthesis, it may also be obtained in various manners such as by isolation and/or purification, such as from a natural source. For instance, suitable fatty acids may be derived such as from isolation from a natural and/or an organic source, such as derived from various plants, marine life, grains, nuts, and/or the actions of various insects, such as bees, for instance, in the production of beeswax, and the like.

The amount of fatty acid and/or fatty alcohol precursors to be reacted varies, such as dependent on the amount of the fatty acid component needed to produce the particular quantity of marker composition desired, such as for the production of a given quantity of crayons. Accordingly, the quantity of the fatty acid component to be employed in the production of the marker composition generally depends to some extent on the amount of other materials constituting the marking composition, particularly, in various instances, the amount of wax, e.g., hard wax, to be employed, if any. For instance, the fatty acid content can be lowered if the hard wax content is suitably increased to provide the desired mechanical strength. The fatty acid content can be increased if the hard wax content is suitably decreased, or excluded altogether, so as to provide the desired laydown characteristics. Hence, the fatty acid content may be present in any suitable amount, for example, it can be present in an amount up to about 80% by weight of the composition.

Hence, in various embodiments, the structural component and/or stiffening component may be composed of any suitable fatty acid and/or bifunctional fatty acid, e.g., steric acid, component. Any suitable fatty acid or bifunctional fatty acid component may be used so long as it or they can be formulated into a supporting structure having sufficient hardness as well as sufficient laydown characteristics. For example, one or more of the components may have a hardness of about 10, of about 15, of about 20, of about 25, of about 30 of about 40, of about 50 or 60, or more at 25° C., as determined by Shore hardness method set forth in ASTM D2240. Further, one or more of the stiffening components may be used such as where the component may be such that it has a melting point of about 110° to about 120° to about 140° to about 160° or 165° to about 180° or up to about 200° to 210° F. For instance, the overall structural and/or stiffening components, when present, may individually be present in an amount of about 0.10% to about 80% or about 90% or 95% by weight, such as from about 1% or about 5% or about 10% to about 60% or about 70%, such as from about 20% or 30% to about 40% or about 50% by weight of the marking composition.

In certain embodiments, the fatty acid component may include one or more fatty acid esters, dimers and trimers of fatty acids, fatty alcohols, mono- and di-esters of propylene glycols, glycerol di-esters, mono- and di-esters of polyethylene glycols, and the like. The fatty acid component, when present, may be present in an amount of from about 3% by weight to about 15% by weight of the marking composition, such as when formulating a marking composition that has increased strength, and in certain other embodiments, the fatty acid is present in an amount of from about 15% by weight to about 30% by weight of the marking composition, such as for a more balanced marker composition having suitable strength and laydown characterizations. Some other embodiments include a fatty acid in an amount of from about 30% by weight to about 55 or 60% by weight of the marking composition, such as where increased laydown characteristics are desired. In various embodiments, one or more of the wax component and/or fatty acid component may or may not be included, but when included may be mixed together in proportional amounts so as to make the wax-like base component to which the pigment and/or other colorant may be added.

Accordingly, the marking composition typically includes a colorant, such as a pigment or dye. Specifically, a marker, such as a crayon, derives its color from a pigment or dye, which may be a water and/or oil insoluble product, and it can be natural or synthetic. Such pigments may be inorganic or organic and/or mixtures thereof and may be isolated from natural source and/or produced via various chemical reactions. For instance, in certain embodiments, the pigment may be an inorganic pigment such as derived from natural oxides, such as metal oxides, for example, iron oxides (FeO—OH), e.g., goethite, hematite, magnetite, manganite, iron manganese oxides, chromium oxides, titanium oxides, e.g., titanium dioxide, red iron oxide, zinc oxides, zinc ferrites, iron blue, iron black, iron yellow, ultramarine blue, prussian blue, alumina white, aluminum powder, bronze powder, mica, a quinacridone pigment, an anthraquinone pigment, a dioxazine pigment, an indigo pigment, a thioindigo pigment, a perinone pigment, a perylenepigment, a pearl pigment, an indolenone pigment, a fluorescent pigment, colored resin particles, a metallic flake pigment, such as aluminum powder, lignite, humic acid, carbon, e.g., carbon black, lampblack, bone black, raw umbers, mixtures thereof and the like.

Further, in various instances, the colorant may be organic, such as derived from a plant, or vegetable, and/or mineral extract, such as a food grade mineral. For example, the renewable, organic, and/or ecofriendly pigment may be one or more colorants derived from sustainable resources such as pigments and/or dyes derived from plants and various vegetables, such as those derived from Kremerpigments,™ such as their naturfaben line. Other examples of organic pigments may be an azo, a naphthol, a dianisidine, a lithol (e.g., lithol red), a diarylide, or a phthalo pigment. Particularly, the azo may be an azo lake pigment, lake red C, brilliant carmine 6B, watchung red, bordeaux 10B, fast yellow, dis-azo yellow, pyrazolone orange, para red, an azo-azomethine pigment; dioxazine pigments, such as dioxazine violet, a dianisidine orange, and the like. Additionally, the organic pigment may be a diarylide yellow, or a phthalo pigment, e.g., phthalocyanine pigments, such as phthalocyanine blue, copper phthalocyanine blue, fast sky blue, and phthalocyanine green; nitroso or nitro pigments, such as a naphthol, e.g., naphthol green, naphthol yellow, naphthol red, naphthol blue; threne pigments, such as anthrapyrimidine yellow, perynone orange, perine red, thioindigo red, indanthrone blue; quinacrydone pigments, such as quinacrydone red, quinacrydone violet, isoindolenone pigments, isoindolenone yellow; dyeing lake pigments, such as peacock blue lake, alkali blue lake, lake red, rhodamine lake, methyl violet lake, and malachite green lake; chromophthal yellow, chromophthal red; indanthrene pigment; and the like. The pigment may be combined with a clay carrier, if desired. Dyes, either acidic or basic, can be used in the marking composition. One or more of the colorants may also include fillers such as clays, talc, and/or calcium carbonates. Various extender pigments may also be used. Examples of suitable dyes include the polymeric colorants such as REACTINT™ brand Blue×3LV, Orange×38, and Violet×80LT, available from the Milliken Chemical Co. in Inman, S.C.

To create such pigments, chemicals may be combined in reaction tanks and then put through a filter to extract the surplus water. In such instances, the pigment material will be left behind and may then be dried in a kiln. Once dry, the pigments may be mixed to derive the desired color, be made into a powder, and then may be blended and added to the reaction mixture, so as to be mixed with the hot wax and/or fatty acid components. In such instances, the pigment may be formulated, e.g., by grinding, atomization, micronization, milling, and the like, in very small, small, medium, large, very large particle size. The pigment can have any suitable particle size, however, the particle size may be from about 0.1 or 0.3 micron to about 20 or about 25 microns, such as a particle size of about 0.5 or 1 micron to about 15 or about 20 microns, such as from about 5 microns to about 10 microns. The colorant may be present in any suitable amount but varies depending on the type of the coloring agent used. For instance, the marking composition may contain a pigment in an amount of from about 0.5% or less to about 50% or more by weight of the marking composition, such as from about 2% or about 5% to about 30% or 35%, such as in the range of about 5% or 10% to about 20% or about 25% by weight based on the weight of the marking composition. Where a dye colorant is used, it may be included in an amount of from about 1% by weight to about 3% by weight of the marking composition.

Additionally, the marking composition may include one or more additives may be incorporated into the marking compositions in minor amounts, such as rust preventives, anticorrosive agents, fillers, leveling agents, viscosity modifiers, e.g., a viscosity controlling agent, a structural viscosity producer, a drying agent, and plasticizers, such as diethyl phthalate, dibutyl phthalate, dioctyl phthalate, 2-ethylhexyl epoxyhexahydro phthalate, 2-ethylhexyl sebacate, tricresyl phosphate, and the like. Further, processing aids such as foam inhibitors and/or mold release agents, as well as oxidation and UV stabilizers may be added. Examples of suitable foam inhibitors include petroleum hydrocarbons such as FOAMKILL® 614 (Crucible Chemical Co., Greenville, S.C.) and cetyl dimethicone.

Examples of suitable mold release agents include the Group IIA metal salts of fatty acids, particularly calcium stearate. Examples of suitable oxidation stabilizers include sterically hindered phenols. Examples of suitable UV stabilizers include hindered amine light stabilizers and benzotriazoles. Furthermore, in various embodiments, a dispersant or dispersing agent may also be included. For instance, a resin, such as a polyvinyl butyral resin, may be employed as a dispersing agent. These additives may typically be added in an amount of from about 0.01% to about 5% by weight of the marking composition, and preferably in an amount of from about 0.1% to about 1% by weight of the marking composition.

Accordingly, the marking composition typically includes a colorant, along with the fatty acid, and a wax component, such as where the wax and/or fatty acid component includes an ester wax. Particularly, the marking composition may contain any suitable fatty acid, such as a saturated fatty acid, an unsaturated fatty acid, or a mixture of fatty acids. For instance, the fatty acid may be one that adds strength to the composition, especially when the composition is fabricated as a crayon. For example, longer carbon chain fatty acids generally impart greater hardness and mechanical strength to the composition, and as such the fatty acid may have from about 12 to about 30 carbon atoms, such as from about 16 to about 24 carbon atoms. Suitable fatty acids, for example, include lauric acid, myristic acid, palmitic acid, stearic acid, and mixtures thereof. As indicated, such components may be added in amounts such that the final marker composition has suitable strength to withstand use in marking, such as by kids, while maintaining smooth laydown characteristics when applied on substrates. Hence, the compositions, as herein disclosed, may also be configured so as to have the advantage that they are substantially free of tackiness to the touch, and may be produced from renewable sources. As indicated above, the present composition is particularly well-suited for use in preparing marking compositions, such as crayons.

Particularly, in various embodiments, a marking composition is included wherein the composition includes a hardening component, so as to depart a structural formation to the marking composition; a softening component, so as to allow for and/or improve the laydown characteristics of the composition, when used as a marker; and a coloring agent, so as to provide as color to the composition. For instance, the marking composition may include an alcohol component, a first fatty acid component, a second fatty acid component, and a colorant. In some instances, a wax component may also be included. However, in some instances, a wax component is not necessary nor included. More particularly, in certain embodiments, the marking composition may include a hardening component, such as derived from the reaction of the alcohol component with the first fatty acid component, so as to provide a first structural and/or hardening composition. Once obtained, this composition may be reacted with or otherwise added to or mixed with the softening agent, such as the second fatty acid, such as including stearic acid and/or palmitic acid. To this mixture the colorant, such as an organic or inorganic pigment, as described herein above, may be added, so as to form the marking composition having a designated color. In various instances one or more additives, as herein described, may also be included.

For example, in particular embodiments, a structural composition may be provided where the composition includes an alcohol component, such as a diol, e.g., a butanediol or hexanediol, such as 1,4-butanediol or 1,6-hexanediol, which is mixed with a fatty acid precursor component, such as a carboxylic acid, such as adipic or succinic acid, so as to produce a first fatty acid component, e.g., via esterification of the alcohol component with the fatty acid precursor component, which may then be added to one or more of a further hardening and/or structural agent, such as a wax component, a softening agent, such as a secondary fatty acid component, and/or a colorant. Particularly, in various embodiments, the first fatty acid component, e.g., containing a butanediol and/or hexanediol mixed with a adipic or succinic acid, may be added to a wax component, such as paraffin or bees wax, which is then formulated and added to both the secondary fatty acid component and the colorant. However, in other embodiments, the first fatty acid component itself is added to the secondary fatty acid component and the colorant in a manner so as to produce the marking composition of the desired color.

For instance, the marking composition of the present disclosure may be prepared by any suitable manner, such as by adding the various components, e.g., the first fatty acid component, the second fatty acid component, and the colorant, to a reactor vessel and heating them to a semisolid, or liquid, state and mixing them together. Generally, a portion of the fatty acids and/or waxes (if included) is heated above its melting temperature, e.g., to about 104-116° C. (220-240° F.). Particularly, first the fatty alcohol precursor component and the fatty acid precursor components may be added to the reaction vessel and heated, such as under pressure, so as to produce a first, waxy or wax-like structural composition. For example, the fatty alcohol portion may be added in any suitable amount, such as from about 10% to about 60%, such as from about 20% to about 40%, including about 30% to about 35% or about 38%. Likewise, the fatty acid precursor component may be added in any suitable amount, such as from about 90% to about 40%, such as from about 80% to about 60%, including about 70% to about 65% or about 62%. In certain embodiments, the fatty alcohol portion and fatty alcohol precursor portion may be added in substantially equal amounts, such as from about 48% to about 52%, including about 50% to about 50% equal parts.

Then, once the first esterified waxy structural component is produced it may then be combined with one or more of the wax component (if included) and/or the fatty acid(s) components that may be added to the semi-solid, liquified waxy material, such as while stirring the composition with a suitable stirring mechanism, such as, for example, a disperser head mixer. For instance, in various embodiments, the first esterified waxy structural component, as described above, may be included in the final mixture such as in any suitable amount such as from about 60% to about 99%, such as about 70% to about 95%, for example, about 80% to about 90%, including about 85% to about 88% of the final composition. In such instances, the softening agent, such as a second fatty acid component may be included in the final mixture such as up to about 40% to about 1% or 0.5%, such as about 30% or about 28% to about 3% or about 5%, for example, about 20% or about 18% to about 10% or 8%, including 15% to about 12%.

In particular instances, a wax component, such as a paraffin or bees wax or similar wax component may also be added to the composition, and when included may be mixed with the first esterified waxy structural component, such as in substantially equal amounts so as to make up the final amount of the waxy component to be added to the overall composition. In certain instances, the waxy mixture may be about 4:1, 3:1, 2:3, 1:4, 1:3, or about 3:2, first waxy component to second wax component. Additionally, where the second wax component is to be included, it may be a mixture of wax components, such as a paraffin and bees wax, which may be added together, such as in equal amounts, to make up the second wax component. Likewise, any suitable amount of colorant may be added to make up the final mixture, such as in an amount of up to about 5% or more, such as from about 0.05% or 1% to about 3% to about 4%, including about 2% of the final composition.

A filler and/or other colorant and/or other suitable additive may also be added, e.g., in sequence, to the composition under continued stirring. If desired, an emollient, along with any further additives, such as cleanability agents and the like, may be added to the liquified material, while continuing to stir the composition. The composition may then be poured into a mold and cooled so as to be appropriately molded, such as by pouring the composition into flatbed molds. The mold is cooled and the composition is shaped into suitable forms for a marker, such as crayons.

More particularly, in a first step, a first fatty acid, such as a first waxy, composition may be generated or otherwise procured. For instance, in a particular embodiment, a reactor, e.g., a 1 L reactor equipped with a condenser may be charged with a fatty alcohol component, e.g., 1,4-butanediol (such as in an amount of about 38-40%), and a fatty acid precursor component, e.g., adipic acid (such as in an amount of about 62-60%), which components may then be mixed and heated, such as above their melting points, e.g., to 180° C., such as in an esterification reaction, for a sufficient amount of time to turn into a semi-solid or liquid, such as for about 4 hours more or less. Alternatively, in a more particular embodiment, a 2 L reactor may be charged with about equal amounts of the fatty alcohol portion, such as about 45% to about 55%, such as about 48% or 49% to about 50% to about 52% of 1,6-hexanediol (760.5 g) and about 45% to about 55%, such as about 48% or 49% to about 50% to about 52% of succinic acid (738.9 g) and may be heated to 185° C. such as for about 15 to about 24 hours, such as about 18 hours to about 20 or 22 hours. During this time, the pressure may be reduced, such as to 700 torr or less, such as to 400 torr, such as to 200 or 100 torr, even to about 50 or 25 torr, e.g., gradually, so as to condense the composition into a denser or semi solid form, such as over 20 or 15 hours, such as bout 10 or 5 or 4 hours, and the excess water generated by the reaction, e.g., esterification, may be collected in a receiver. The reaction may then be continued at 180 or about 185° C. to about 190 to about 200° C., and the pressure may be reduced even more, such as to 1 torr pressure for about 18 hours or 10 hours or 5 hours, such as for about the last 3 hours.

Accordingly, the first fatty acid structural component product, e.g., an off-white waxy solid, may then be collected and added to a second vessel for production of the marking composition. For instance, the first fatty acid structural component product may be added to a new vessel for the production of the final marker composition, such as in an amount of about 70%, such as about 80%, such as about 85%, even about 88% or 90% or 95% of the total marker composition. Likewise, in a second step, the wax component, e.g., paraffin and/or beeswax, as described above, and/or the softening agent, e.g., the second fatty acid component, e.g., stearic acid, may be added to the second vessel containing the first fatty acid component. Particularly, the second fatty acid component may be added in an amount of about 20% or more, such as about 15% or 10%, such as about 8% or 5% or less of the final composition. Additionally, a colorant, such as a pigment, such as a pigment as an exemplary listed above, may be added to make up the final mixture, such as in an amount of up to about 5% or more, such as from about 0.05% or 1% to about 3% to about 4%, including about 2% of the final composition.

In particular embodiments, 100 g to about 200 g, such as about 120 g to about 180 g, such as about 160 g or about 165 g to about 174 or 175 g, including about 150 g to about 164 g of the first fatty acid structural component product may be used, such as in a first exemplary formulation. In certain instances, a part of the above mixture may include or be added to a wax component, such as a paraffin and/or bees wax component, which may be present in an amount of up to about 50% of the first fatty acid structural component product. However, in certain embodiments, the wax component may be up to about 5% to about 10%, such as about 15% to about 20% or about 25%. For instance, when included the wax component may be about 5 or about 9 or 10 g to about 14 or 15 g or about 20 g, such as where the wax component includes about 7 g paraffin wax and/or 7 g bees wax, in one embodiment. However, in various instances, such a wax component need not be and is not included. Additionally, the in particular embodiments, the colorant may be present in an amount of about 2 g to about 10 g, such as about 4 g to about 8 g, including about 5 or 6 g.

Consequently, a marking composition was formulated in accordance with the above, and it was found that the composition was hard enough so as to be handled by children and to resist easy breakage, yet was soft enough, e.g., due to the presence of the softening agent, to allow for a smooth and slick laydown of the composition on a substrate with minimal pressure being applied, such as in the course of the normal marking of a substrate, e.g., a piece of paper, with the composition. It was also observed that the color was rich and substantially uniform and the composition overall evidenced less flaking. Thus, the laydown characteristics of compositions herein disclosed are improved over such characteristics of previously available compositions. Hence, the marking composition of the present disclosure are suitable for use as writing instruments, such as crayons, and may be applied to a variety of porous and non-porous writing surfaces or substrates, such as paper, with lack of breakage, brittleness, smeariness, and enhanced putdown.

It will be appreciated by those skilled in the art that the marking compositions of the present disclosure can be varied, depending upon the selection of certain of the major components and the amounts of those components. This allows the composition to be modified to achieve the desired colors, structural stability, and laydown characteristics. For instance, in various combinations as herein described the marking compositions of the disclosure, e.g., crayons, can be formulated in accordance with the methods described above, so as to be from about 70% to about 80% or about 90% or 95% to 100% plant derived, and/or about 70% to about 80% or about 90% or 95% to 100% renewable, and/or about 70% to about 80% or about 90% or 95% to 100% compostable, and safe, such as safe for use and/or consumption, by children.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A marking composition comprising:
a condensation polymer which is a reaction product of a diol and a dicarboxylic acid, in an amount from about 10% to about 90% by weight of the composition;
one or more fatty acids containing from 10 to 24 carbon atoms, or an ester thereof, in an amount from about 20% to about 80% by weight of the composition; and
a colorant, in an amount from about 1% to about 15% by weight of the composition,
wherein the polymer has a Shore D hardness value from 35 to 65, and
wherein the condensation polymer has a weight average molecular weight of from about 5000 to about 15,000 daltons and is selected from the group consisting of poly(butylene adipate), poly(hexylene succinate), and poly(propylene adipate).

2. The marking composition of claim 1, wherein the polymer comprises from about 20% to about 80% by eight of the composition.

3. The marking composition of claim 1, wherein the diol and the dicarboxylic acid each contain 2 to 14 carbon atoms.

4. The marking composition of claim 1, wherein the polymer has a melting point from about 40 C to about 75 C.

5. The marking composition of claim 1, wherein the composition comprises one or more fatty acids containing from 14 to 18 carbon atoms, or an ester thereof, in an amount from about 20% to about 80% by weight of the composition.

6. The marking composition of claim 1, wherein the one or more fatty acids comprise are fully saturated fatty acids.

7. The marking composition of claim 1, wherein the one or more fatty acids have a weight average molecular weight of from about 100 to about 400 daltons.

8. The marking composition of claim 1, wherein the colorant is an inorganic pigment.

9. The marking composition of claim 1, wherein the colorant is a pigment having an average particle size from about 0.1 micron to about 25 microns.

10. The marking composition of claim 1, wherein the colorant is derived from plants or vegetables.

11. The marking composition of claim 1, further comprising one or more additives selected from the group consisting of rust preventives, anticorrosive agents, fillers, leveling agents, viscosity modifiers, drying agent, plasticizers, foam inhibitors, mold release agents, and polymer stabilizers.

12. A writing instrument comprising a marking composition,
wherein the writing instrument is selected from the group consisting of crayons, wax pastels, grease pencils, water-soluble crayons, colored ink markers, colored charcoals, and chalks; and
wherein the marking composition comprises
a condensation polymer which is a reaction product of a diol and a dicarboxylic acid, in an amount from about 10% to about 90% by weight of the composition;
one or more fatty acids containing from 10 to 24 carbon atoms, or an ester thereof, in an amount from about 20% to about 80% by weight of the composition; and
a colorant, in an amount from about 1% to about 15% by weight of the composition;
wherein the polymer has a Shore D hardness value from 35 to 65, and
wherein the polymer has a weight average molecular weight of from about 5000 to about 15,000 daltons and is selected from the group consisting of poly(butylene adipate), poly(hexylene succinate), and poly(propylene adipate).

13. The writing instrument of claim 12, wherein the polymer comprises from about 20% to about 80% by eight of the composition.

14. The writing instrument of claim 12, wherein the diol and the dicarboxylic acid each contain 2 to 14 carbon atoms.

15. The writing instrument of claim 12, wherein the polymer has a melting point from about 40 C to about 75 C.

16. The writing instrument of claim 12, wherein the marking composition comprises one or more fatty acids containing from 14 to 18 carbon atoms, or an ester thereof, in an amount from about 20% to about 80% by weight of the composition.

17. The writing instrument of claim 12, wherein the one or more fatty acids comprise are fully saturated fatty acids.

18. The writing instrument of claim 12, wherein the one or more fatty acids have a weight average molecular weight of from about 100 to about 400 daltons.

19. The writing instrument claim 12, wherein the colorant is an inorganic pigment.

20. The writing instrument of claim 12, wherein the colorant is a pigment having an average particle size from about 0.1 micron to about 25 microns.

21. The writing instrument of claim 12, wherein the colorant is derived from plants or vegetables.

22. The writing instrument of claim 12, wherein the marking composition further comprises one or more additives selected from the group consisting of rust preventives, anticorrosive agents, fillers, leveling agents, viscosity modifiers, drying agent, plasticizers, foam inhibitors, mold release agents, and polymer stabilizers.

23. The writing instrument of claim 12, wherein the writing instrument is a crayon.

* * * * *